United States Patent [19]

Sekine et al.

[11] Patent Number: 5,204,565
[45] Date of Patent: Apr. 20, 1993

[54] SMALL-SIZED ELECTRIC MOTOR WITH CONNECTOR FOR POWER SUPPLY

[75] Inventors: Shuji Sekine; Yukihide Shibata, both of Yokohama, Japan

[73] Assignee: Jidosha Denki Kogyo Kabushiki Kaisha, Yokohama City, Japan

[21] Appl. No.: 794,239

[22] Filed: Nov. 19, 1991

[30] Foreign Application Priority Data

Nov. 21, 1990 [JP] Japan .............. 2-121978[U]
Nov. 21, 1990 [JP] Japan .............. 2-121979[U]
Nov. 21, 1990 [JP] Japan .............. 2-121980[U]

[51] Int. Cl.$^5$ .......................................... H02K 11/00
[52] U.S. Cl. ...................................... 310/71; 439/855
[58] Field of Search ..................... 310/43, 71, 89; 439/224, 854, 855

[56] References Cited

U.S. PATENT DOCUMENTS

| 3,222,6333 | 12/1965 | Skony | 439/855 |
| 2,403,642 | 7/1946 | Draxler | 310/71 |
| 2,968,786 | 1/1961 | Wooton | 439/855 |
| 3,079,578 | 2/1963 | Swengel | 439/855 |
| 3,312,931 | 4/1967 | Keller | 439/855 |
| 3,720,907 | 3/1973 | Asick | 439/855 X |
| 4,820,179 | 4/1989 | Saijo | 439/224 |
| 4,851,725 | 7/1989 | Keck | 318/71 |
| 5,126,608 | 6/1992 | Sogabe et al. | 310/71 |

*Primary Examiner*—Steven L. Stephan
*Assistant Examiner*—E. H. To
*Attorney, Agent, or Firm*—Sughrue, Mion, Zinn, Macpeak & Seas

[57] ABSTRACT

A small-sized electric motor comprises a housing consisting of a motor case and a gear case, a pair of power terminals protruding outwardly from the housing to supply electric power to an armature of the motor and a connector housed with a pair of socket terminals for receiving the power terminals perpendicularly to the protruding direction of the power terminals. It is possible to connect the connector to the housing of the motor very easily and securely.

3 Claims, 6 Drawing Sheets

SMALL-SIZED ELECTRIC MOTOR WITH CONNECTOR FOR POWER SUPPLY

BACKGROUND OF THE INVENTION

1. Field of the Invention

This invention relates to a small-sized electric motor used for, for example, driving a window glass up and down in a power window system of an automotive vehicle.

2. Description of the Prior Art

Heretofore, there has been used a small-sized electric motor as a motor suitable for the aforementioned purpose, for example, which has structure shown in FIG. 8 and FIG. 9.

In a small-sized electric motor 100 shown in the figures, an armature 102 is housed in a motor case 101 forming a part of a housing, and the motor case 101 is connected with a gear case 104 housed with reduction gears 103 and forming another part of the housing at an opening 101a thereof.

A commutator 102a of the armature 102 is in contact with brushes (not shown) and the brushes are connected with power terminals 105 and 106, respectively.

The power terminals 105 and 106 protrude toward the gear case 104 in the rightward direction from an end bracket 104a provided on the left side of the gear case 104 as shown in FIG. 8, and the power terminals 105 and 106 are connected with a connector 109.

The connector 109 is provided, as shown in FIG. 9, with socket terminals 110 and 111 connected to ends of lead wires 107 and 108, respectively. By pressing the connector 109 toward the power terminals 105 and 106 from the right side in FIG. 8 until the end face 109a of the connector 109 comes in contact with the end bracket 104a, the socket terminals 110 and 111 are fitted onto the respective power terminals 105 and 106 in the horizontal direction as shown in FIG. 8, whereby they are connected electrically with each other.

Furthermore, the lead wires 107 and 108 are secured to the gear case 104 through a clamp 112 screwed on the gear case 109 at the middle part thereof.

By supplying electric power to an armature coil of the armature 102 through the lead wires 107 and 108, the socket terminals 110 and 111, the power terminals 105 and 106, the brushes and the commutator 102a, the armature 102 rotates in either direction according to the current direction.

In the above-mentioned conventional small-sized electric motor 100, it is necessary to provide open space sufficient to insert the power terminals 105 and 106 into the socket terminals 110 and 111 in the connector 109 since the electric motor 100 is so structured that the power terminals 105 and 106 are connected with the socket terminals 110 and 111 by pressing the connector 109 toward the end bracket 104a in the horizontal direction and inserting the power terminals 105 and 106 into the socket terminals 110 and 111.

However, it is not always easy to provide a sufficiently wide space in the vicinity of the end bracket 104a disposed with the power terminals 105 and 106 because the small-sized motor 100 is designed considering miniaturization preferentially in most cases. Therefore, it is difficult to fit the connector 109 onto the power terminals 105 and 106 and there is a problem in that it is impossible to improve the work efficiency in the assembly process of the motor 100.

Furthermore, because the lead wires 107 and 108 connected with the respective socket terminals 110 and 111 are secured to the gear case 104 through the clamp 112, it is not only necessary to keep a large number of parts in stock inclusive of the clamp 112 and the screw to fix the clamp 112 on the gear case 104, but also necessary to shift the clamp 112 into another position in order to turn the direction of the lead wires 107 and 108 to the left side from the right side in FIG. 8.

Accordingly, there are other problems in that the total man-hours required to assemble the motor 100 increase owing to the low work efficiency, and cost of the parts increases remarkably.

In addition to above, there is another problem since there is the possibility that the connector 109 is disconnected from the gear case 104 when external force is applied on the connector 109, because the connector 109 is fitted to the gear case 104 by merely inserting the power terminals 105 and 106 into the socket terminals 110 and 111 in the connector 109.

SUMMARY OF THE INVENTION

This invention, therefore, is made in consideration of the aforementioned problems of the prior art, and it is an object to provide a small-sized electric motor which is possible to be connected with a connector for power supply easily and securely, possible to easily direct lead wires connecting the connector and a power source toward the desired direction selectively without increasing parts in number and advantageous from the view point of the production cost.

The construction of the small-sized electric motor according to this invention for attaining the above-mentioned object is characterized by comprising a housing consisting of a motor case housing an armature and a gear case housing reduction gears, a pair of power terminals protruding outwardly from the housing and connected with brushes to supply electric power to the armature, and a connector provided with a pair of socket terminals for receiving the power terminals perpendicularly to the protruding direction of the power terminals and securing electric connection with the power terminals and lead wires for connecting the socket terminals with a power source.

In the small-sized electric motor according to one preferred aspect of this invention, the connector is provided with a connector cap for restraining the lead wire in a position directing them toward the desired direction. In this case, it is preferable to form the connector and the connector cap in a unitary body.

Furthermore, the small-sized electric motor according to another preferred aspect of this invention is provided with a connector fitting part for receiving the connector on the housing formed with a motor case and a gear case, and it is preferable that the housing is further provided with a connector holding projection and a connector supporting plate in the vicinity of the connector fitting part, and the connector is provided with an engaging piece to be engaged with the connector holding projection and a hook to be engaged with the connector supporting the plate in a position in which the connector is inserted into the connector fitting part for holding and supporting the connector so as not to be pulled out or disconnected from the connector fitting part.

In the small-sized electric motor according to this invention, it is easy to fit the connector securely even if the space to insert the connector can not be very wide in the vicinity of the power terminals because the socket terminals receive the power terminals perpendicularly to the protruding direction of the power terminals. In the preferred aspect of this invention, the connector cap facilitates changing the direction of the lead wires selectively and the parts decrease in number since the connector cap restrains the lead wires in the desired direction instead of the clamp and the screw. Furthermore, the connector is connected securely to the power terminals on the housing of the motor in another preferred aspect of this invention because the engaging piece and the hook provided to the connector are firmly engaged with the connector holding projection and the connector supporting plate formed on the housing side in a position in which the connector is inserted into the connector fitting part provided on the housing of the motor.

DESCRIPTION OF THE PREFERRED EMBODIMENT

A small-sized electric motor according to an embodiment of this invention will be described below in reference to FIG. 1 to FIG. 7.

Figure 1:
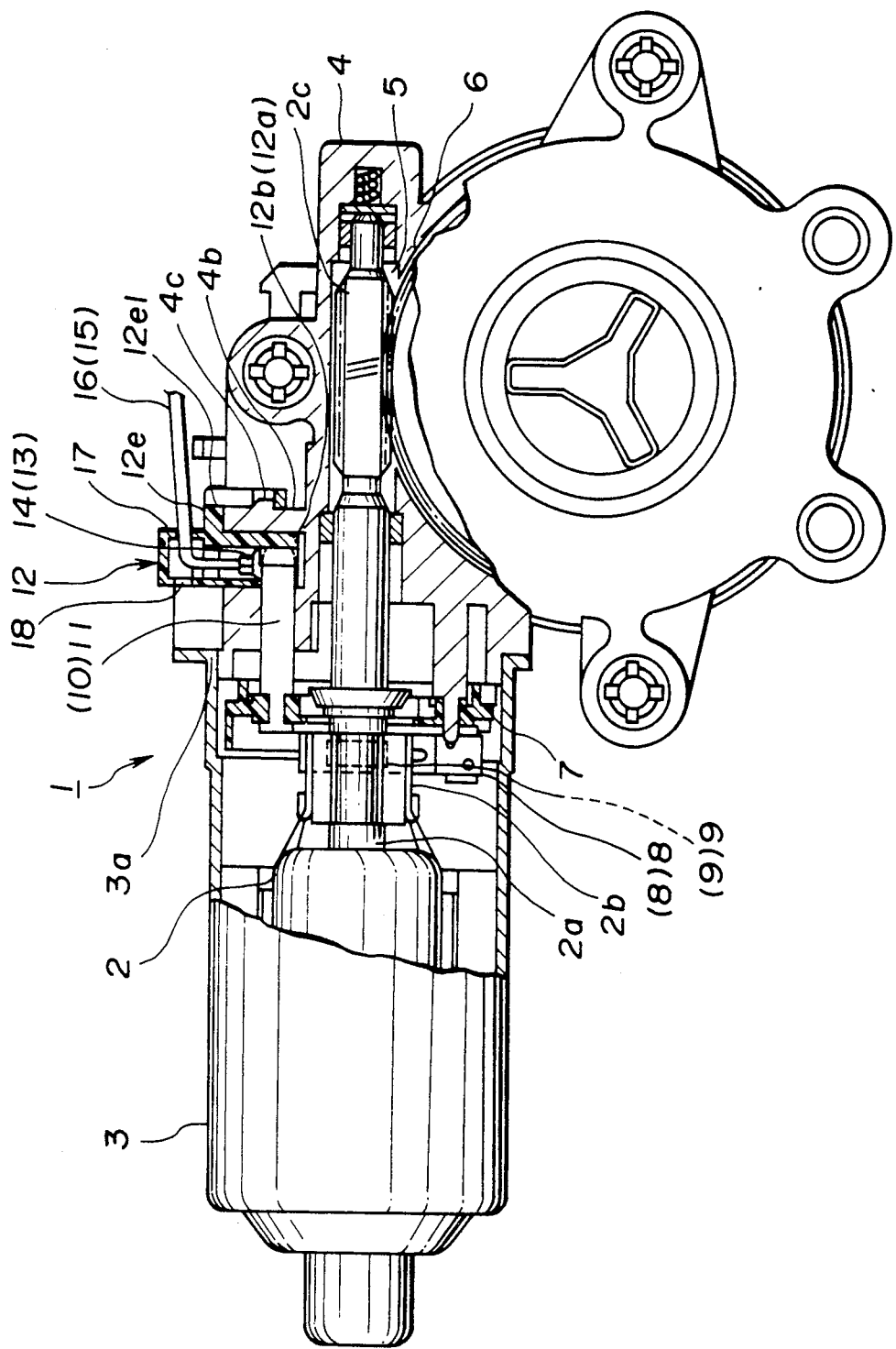
FIG. 1 is a partially sectional front view illustrating the small-sized electric motor according to an embodiment of this invention.

Namely, in a small-sized electric motor 1 shown in FIG. 1, an armature 2 is housed in a motor case 3 which forms a part of a housing of the motor 1 and has an opening 3a on the right side thereof, and is provided with a commutator 2b at the middle part of an armature shaft 2a. The armature 2 is formed with a worm 2c on the armature shaft 2a at the right side of the commutator 2b protruding into a gear case 4 coupled with the motor case 3 shown in FIG. 1.

The gear case 4 is coupled with the motor case 3 at the opening 3a by screwing bolts through an end bracket 4a provided on the left side part thereof, and houses rotatably a worm wheel 6 forming reduction gearing 5 by being meshed with the worm 2c of the armature shaft 2a.

The gear case 4 is fixed with a holder base 7 made of synthetic resin at the leftward end thereof as shown in FIG. 1, and brushes 9, 9 are disposed on the lower side of the holder base 7 through brush holders 8, 8 and the brushes 9, 9 are in contact with the commutator 2b.

On the upper part of the holder base 7, power terminals 10 and 11 connected to the respective brush holders 8, 8 are fixed by passing through the holder base 7 at the base ends thereof, and the other ends of the power terminals 10 and 11 protrude rightwardly into a connector fitting part 4b formed on the upper part of the end bracket 4a passing through the end bracket 4a of the gear case 4 forming a part of the housing, as shown in FIG. 1.

Figure 2:
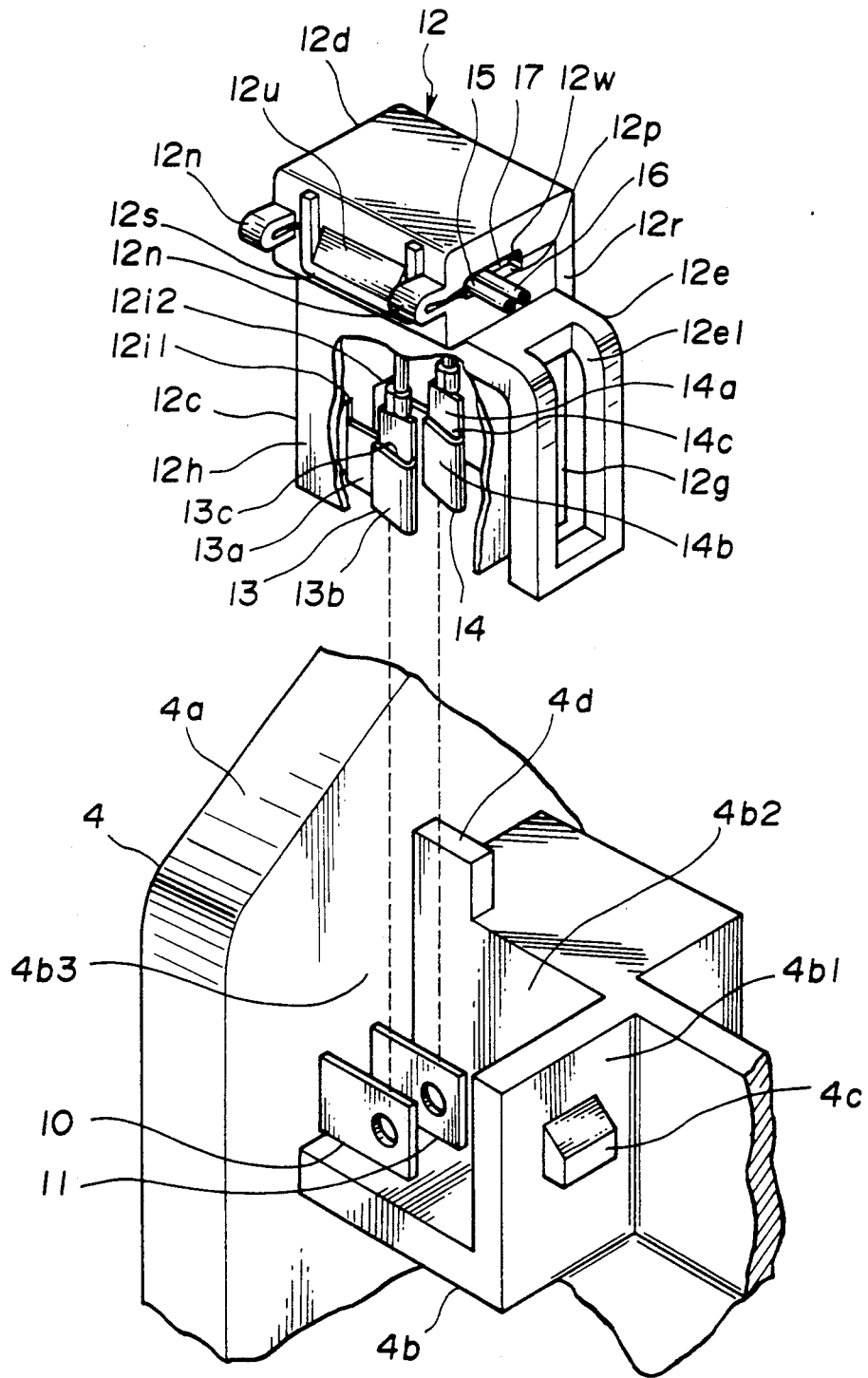
FIG. 2 is a perspective view illustrating the connective relationship between the connector and the connector fitting part in the small-sized electric motor shown in FIG. 1.

The connector fitting part 4b is provided with a partition wall 4b1, a side wall 4b2 and an end bracket wall 4b3 as shown in FIG. 2, and the partition wall 4b1 is disposed with a connector holding projection 4c on the outer side wall thereof, which is shaped in a rectangular prism of which the upper face is sloping. In addition, a connector supporting plate 4d is formed on a corner between the side wall 4b2 and the end bracket wall 4b3 so as to protrude upwardly in a rectangular plate-like shape having a face even with the side wall 4b2.

Figure 3:
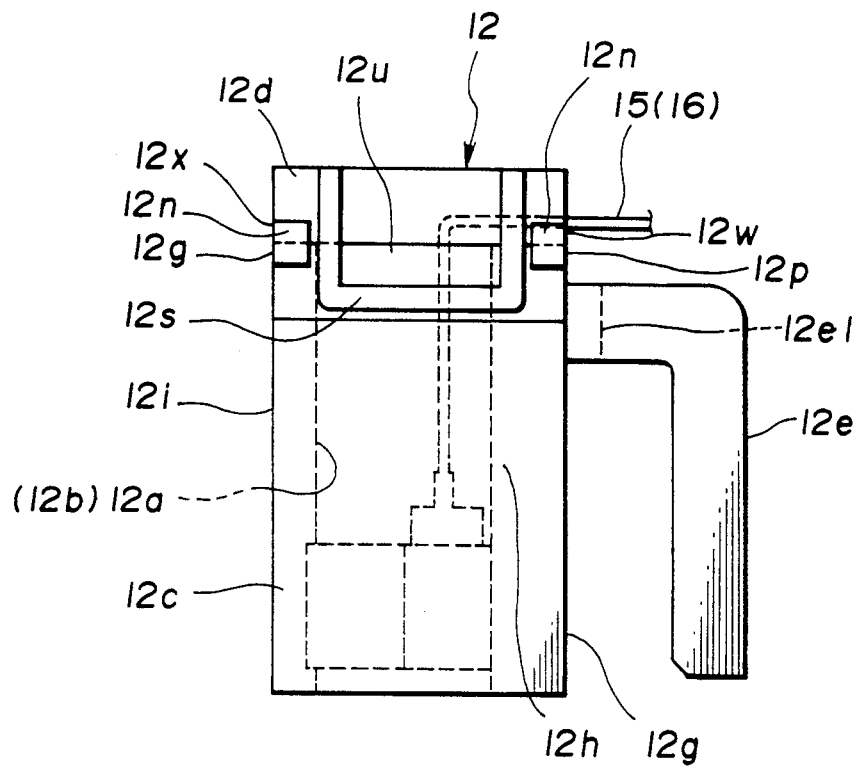
FIG. 3, FIG. 4, FIG. 5, FIG. 6 and FIG. 7 are a front view, a right side elevation view, a rear elevation view, a left side elevation view and a bottom view of the connector in the small-sized electric motor shown in FIG. 1, respectively.

A connector 12 is composed of a connector body 12c having outside measurements slightly smaller than interior measurements of the connector-fitting part 4b and provided with terminal holder parts 12a and 12b in the middle thereof and a connector cap 12d formed in one body united with the connector body 12c so as to fit onto the upper part of the connector body 12c as shown in FIGS. 2 to 7, and the respective terminal holder parts 12a and 12b contain socket terminals 13 and 14 formed so as to receive the power terminals 10 and 11 protruding into the connector-fitting part 4b through the end bracket 4a of the gear case 4 and to secure the electric connection with the power terminals 10 and 11. The connector body 12c is provided with an engaging piece 12e having a cutout 12e1 in its center and extending in an inverted L-shape from a side wall thereof as shown in FIGS. 2 and 3, and so designed as to engage the engaging piece 12e to the connector holding projection 4c disposed on the outer side wall of the pertition wall 4b1 of the connector fitting part 4b.

Figure 4:
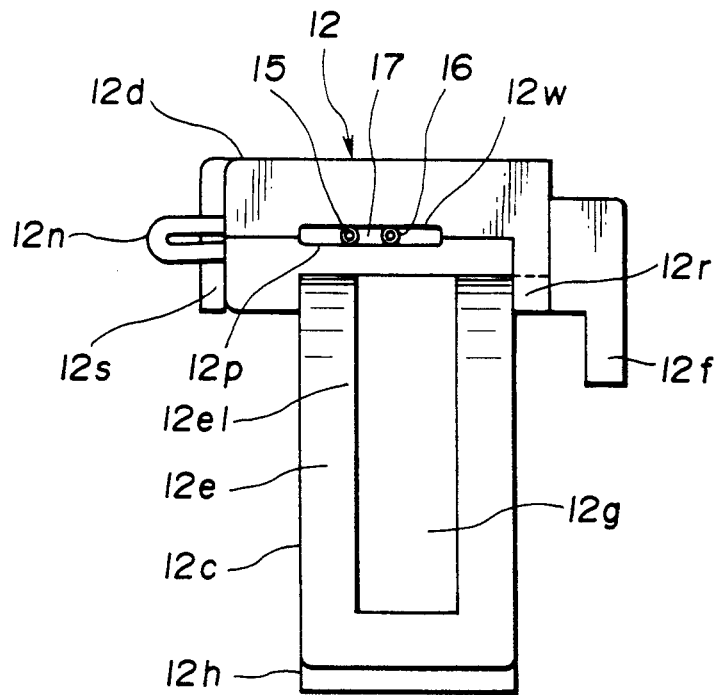

In addition, the connector body 12c is provided with a hook 12f extending rightwardly in an inverted L-shape from the upper right side part thereof as shown in FIG. 4, and so designed as to engage the hook 12f to the connector supporting plate 4d disposed on the corner between the side wall 4b2 and the end bracket wall 4b3 of the connector fitting part 4b.

Figure 6:
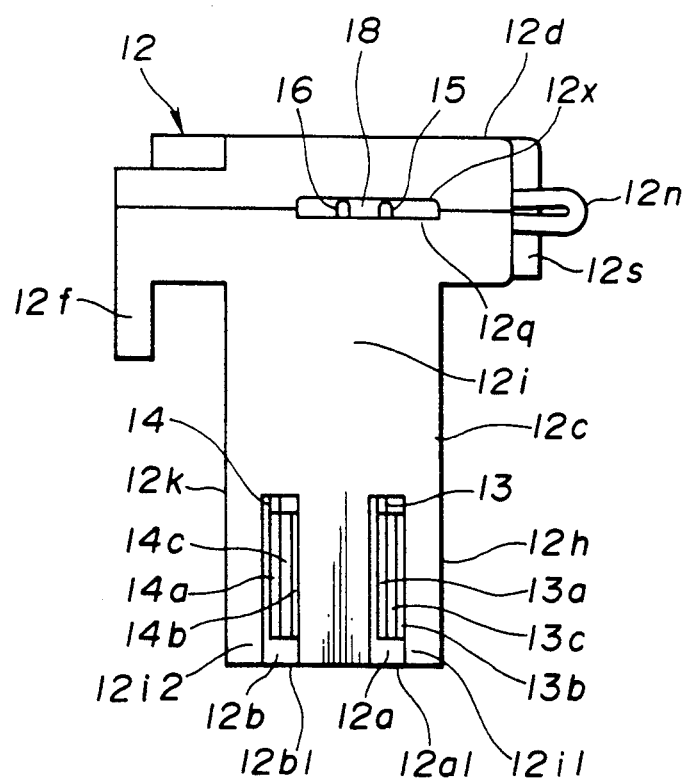
Figure 7:
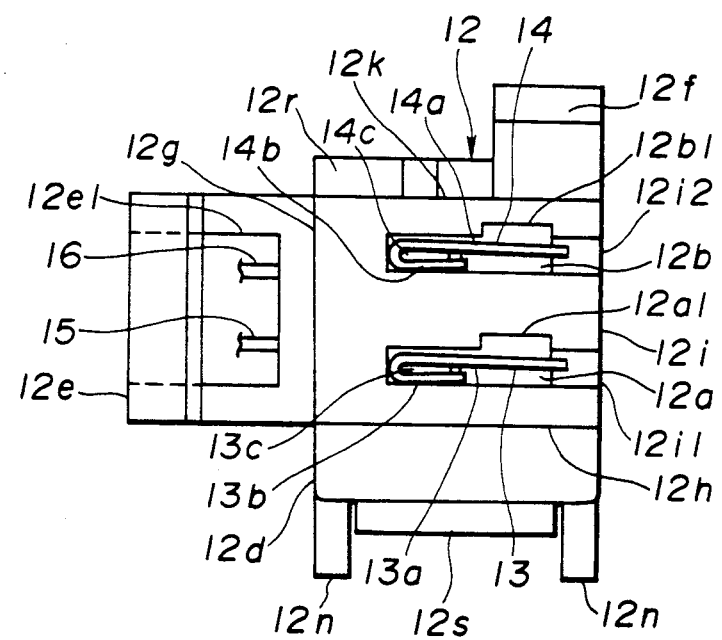
Figure 8:
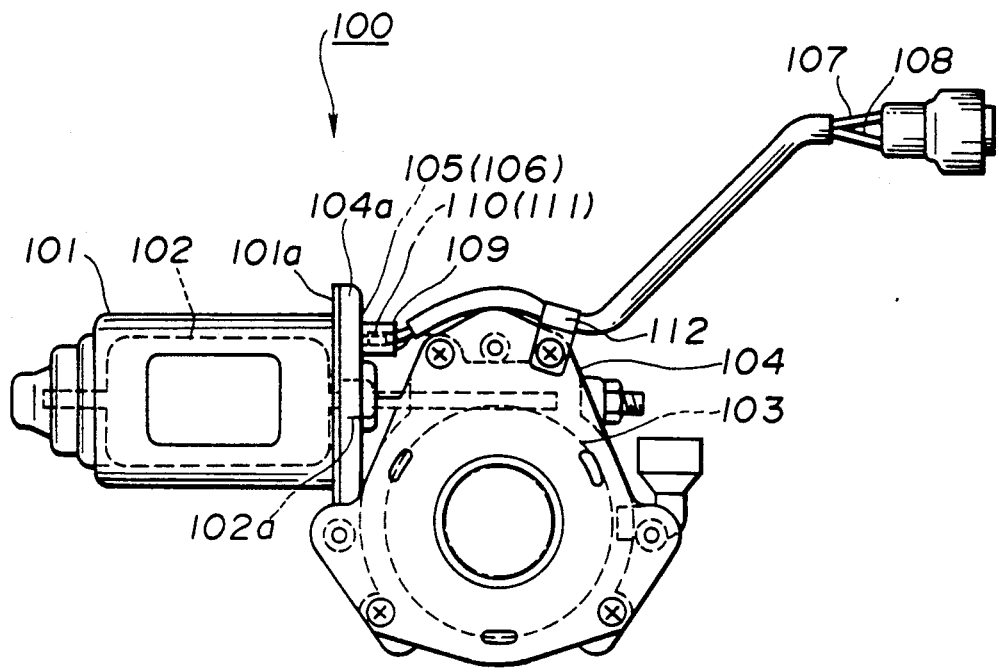
FIG. 8 is a front view of the conventional small-sized electric motor.
Figure 9:
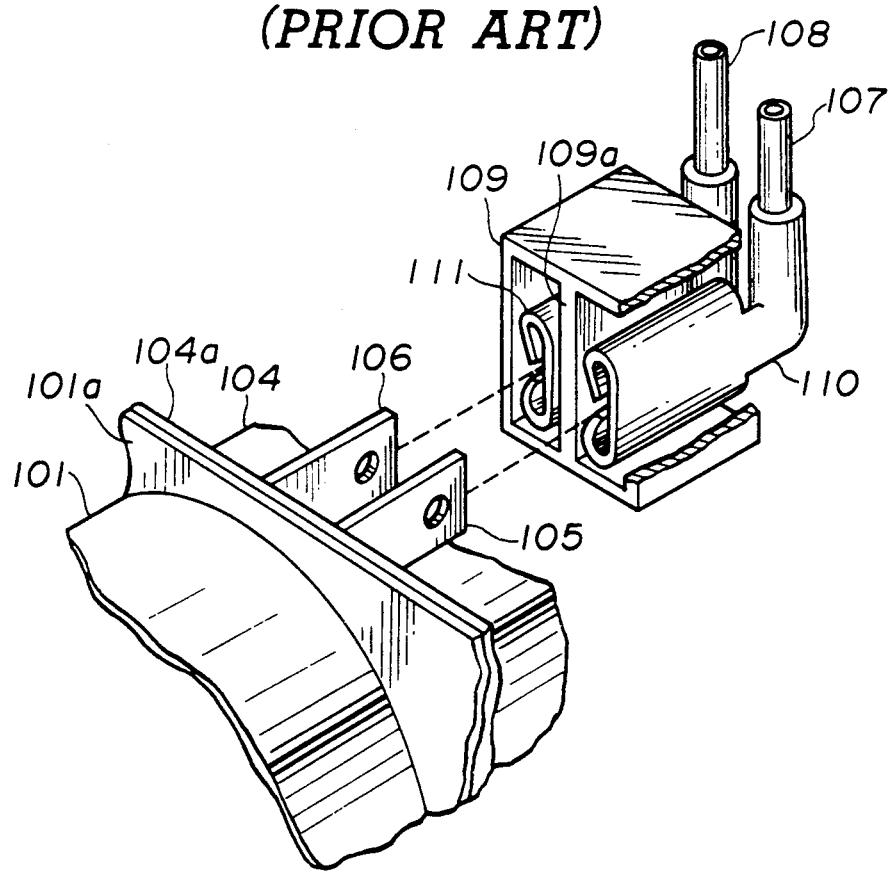
FIG. 9 is a perspective view showing the connection between the connector and the motor body in the conventional small-sized electric motor shown in FIG. 8.

The connector body 12c is formed with apertures 12a1 and 12b1 in its bottom face on the lower side of the terminal holder parts 12a and 12b as shown in FIGS. 6 and 7, and provided with slits 12i1 and 12i2 communicating with the apertures 12a1 and 12b1 for insertion of the respective power terminals 10 and 11 through the side wall 12i on the left side in FIG. 3 into the space defined by the four side walls 12g, 12h, 12i and 12k of the connector body 12c.

Furthermore, the connector body 12c is formed in one body united with the connector cap 12d through hinges 12n connecting bendably between the connector body 12c and the connector cap 12d at the left side end thereof as shown in FIG. 4, and is provided with a first wire holding recess 12p and second wire holding recess 12q at the right and left sides of the top part of the connector body 12c shown in FIG. 3 for restraining lead wires 15 and 16 (which will be described later) in the rightward or leftward direction shown in FIG. 1, respectively.

Figure 5:
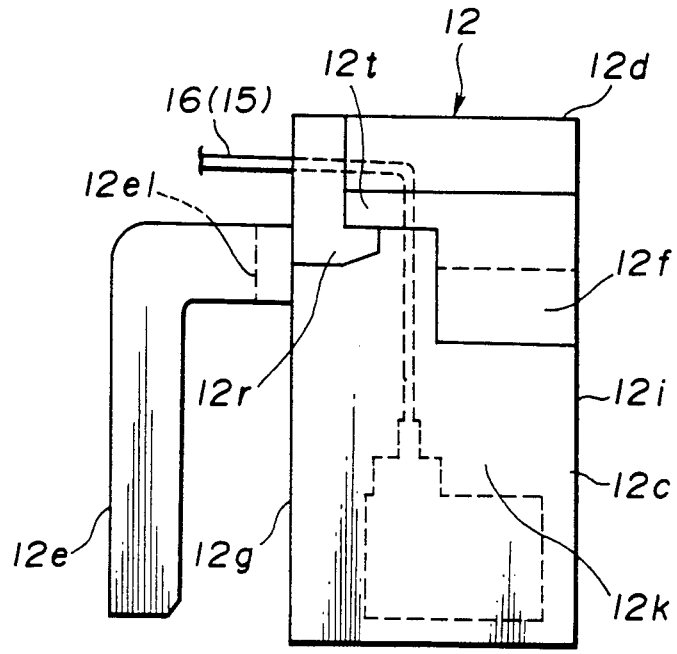

On the other hand, the connector cap 12d is provided with a L-shaped hook 12r and a U-shaped engaging piece 12s on its right and left sides shown in FIG. 4 so as to engage the hook 12r and the engaging piece 12s to projections 12t and 12u disposed on the upper part of the connector body 12c, respectively as shown in FIGS. 2, 3 and 5.

Additionally, on the lower side of the connector cap 12d shown in FIGS. 4 and 6, a first wire restraining recess 12w and a second wire restraining recess 12x are formed so as to be opposed to the respective first and second wire holding recesses 12p and 12q, and the lead wires 15 and 16 are so designed as to be restrained selectively at a first wire holder part 17 formed between the wire holding recess 12p and the wire restraining recess 12w or a second wire holder part 18 formed between the wire holding recess 12q and the wire restraining recess 12x when the hook 12r and the engaging piece 12s of the connector cap 12d are engaged to the projections 12t and 12u of the connector body 12c, respectively.

The socket terminals 13 and 14 contained in the respective terminal holder parts 12a and 12b of the connector 12 are made of metallic material having some elasticity such as copper, brass or the like, and are provided with terminal fitting parts 13c and 14c formed by folding back their ends 13b and 14b and having gaps for receiving the power temrnals 10 and 11 and securing electric connection with the respective power terminals 10 and 11 between base parts 13a, 14a and the ends 13b, 14b of the socket terminals 13 and 14.

The socket terminals 13 and 14 are connected electrically with the lead wires 15 and 16 at the upper ends thereof, and the lead wires 15 and 16 are fixed in the first wire holder part 17 and directed in the rightward direction in FIG. 1 by fitting the connector cap 12d on the connector body 12c after putting the lead wires 15 and 16 on the first wire holding recess 12p of the connector body 12c. At this time, if it is necessary to direct the lead wires 15 and 16 in the leftward direction in FIG. 1, the lead wires 15 and 16 are fixed in the second wire holder part 18 by fitting the connector cap 12d on the connector body 12c after putting the lead wires 15 and 16 on the second wire holding recess 12q.

By inserting the connector 12 into the connector fitting part 4b of the gear case 4 pressingly in the downward direction in FIG. 2, that is the direction perpendicular to the protruding direction of the power terminals 10 and 11, the power terminals 10 and 11 are inserted into the terminal fitting part 13c and 14c of the socket terminals 13 and 14 respectively through slits 12i1 and 12i2 of the connector body 12.

When the respective power terminals 10 and 11 are fitted securely into the connector fitting part 4b and connected electrically with the socket terminals 13 and 14, the engaging piece 12e of the connector body 12c is engaged with the connector holding projection 4c and the hook 12f of the connector body 12c is engaged with the connector supporting plate 4d disposed on the connector fitting part 4b, whereby the connector 12 is never pulled out and disconnect from the connector fitting part 4b of the gear case 4.

By supplying electric power to the armature 2 in this state through the lead wires 15 and 16, the socket terminals 13 and 14, the power terminals 10 and 11, the brush holders 8, the brushes 9 and the commutator 2b, the armature 2 rotates in either direction according to the current direction. The worm wheel 6 is rotated by the rotation of the armature 2 through the worm 2c of the armature shaft 2a, thereby driving, for example, the window glass connected with the worm wheel 6 up and down.

As described above, in the small-sized electric motor according to this invention having the aforementioned structure, an excellent effect can be obtained in that it is possible to fit the connector to the housing of the motor very easily and possible to connect electrically the socket terminals with the power terminals very securely even if the space to insert the connector is not provided so widely in the vicinity of the power terminals protruding from the housing of the motor because the socket terminals contained in the connector receive the power terminals perpendicularly to the protruding direction of the power terminals. Further effects can be obtained in that it is possible to direct the lead wires in the desired direction easily and securely and possible to reduce the production cost because the connector cap restrains the lead wires in the desired direction by fitting it onto the connector body instead of the clamp and the screw. In addition to above another excellent effect can be obtained in that the connector is connected very easily and securely to the power terminals so as not to be pulled out and disconnected from the power terminals standing out from the housing of the motor because the housing of the motor is provided with the connector fitting part, and the engaging piece and the hook provided to the connector are firmly engaged with the connector holding projection and the connector supporting plate disposed on the connector fitting part at the state in which the connector is inserted into the connector fitting part of the housing of the motor.

What is claimed is:

1. In combination with a motor housing of a motor and an electrical connector mounted on said housing of the motor:

said housing having a pair of power terminals passing therethrough for supplying electric current to the motor and a connector fitting portion protruding therefrom and located in the vicinity of said power terminals, said connector fitting portion having a side wall extending outwardly from said housing adjacent said power terminals and a partition wall supported on the side wall in spaced relation to said housing, said partition wall having a projecting member thereon; and said electrical connector having a pair of socket terminals for receiving said power terminals of said housing of the motor perpendicularly to the protruding direction of said power terminals, said socket terminals being disposed in a connector body having a pair of apertures in a bottom wall thereof and a pair of slits communicating with said apertures and located in a side wall thereof, through which said power terminals of said housing are conducted, said connector body being located in said connector fitting portion of said housing of the motor between said housing and said partition wall, a pair of lead wires connected to said socket terminals respectively, a connector cap connected to said connector body by a hinge and holding the lead wires between said cap and the connector body, and an engaging member on said connector body engaged with the projecting member on said partition wall of said housing of the motor to secure said connector body to said housing.

2. In combination with a motor housing of a motor and an electrical connector mounted on said housing of the motor:

said housing having a pair of power terminals passing therethrough for supplying electric current to the motor and a connector fitting portion protruding therefrom and located in the vicinity of said power terminals, said connector fitting portion having a side wall extending outwardly from said housing adjacent said power terminals and a partition wall supported on the side wall in spaced relation to said housing, said partition wall having a projection thereon and said side wall having a connector supporting plate thereon; and said electrical connector having a pair of socket terminals for receiving said power terminals of said housing of the motor perpendicularly to the protruding direction of said power terminals, said socket terminals being disposed in a connector body and having a pair of apertures in a bottom wall thereof and a pair of slits communicating with said apertures and located in a side wall thereof, through which said power terminals of said housing are conducted, said connector body being located in said connector fitting portion of said housing of the motor between said housing and said partition wall, a pair of lead wires connected to said socket terminals respectively, a connector cap connected to said connector body by a hinge and holding the lead wires between said cap and the connector body, an engaging piece on said connector body engaged with the projection on said partition wall of said housing of the motor and a hook on said connector body engaged with the connector supporting plate on said side wall of said housing of the motor to secure said connector body to said housing.

3. In combination with a motor housing of a motor and an electrical connector mounted on said housing of the motor:

said housing having a pair of power terminals passing therethrough for supplying electric current to the motor and a connector fitting portion protruding therefrom and located in the vicinity of said power terminals, said connector fitting portion having a side wall extending outwardly from said housing adjacent said power terminals and a partition wall supported on the side wall in spaced relation to said housing, and said side wall having a projecting member thereon; and said electrical connector having a pair of socket terminals for receiving said power terminals of said housing of the motor perpendicularly to the protruding direction of said power terminals, said socket terminals being disposed in a connector body and having a pair of apertures in a bottom wall thereof and a pair of slits communicating with said apertures and located in a side wall thereof, through which said power terminals of said housing are conducted, said connector body being located in said connector fitting portion of said housing of the motor between said housing and said partition wall, a pair of lead wires connected to said socket terminals respectively, a connector cap connected to said connector body by a hinge and holding the lead wires between said cap and the connector body, and an engaging member on said connector body engaged with the projecting member on said side wall of said housing of the motor to secure said connector body to said housing.

* * * * *